US012249778B2

(12) United States Patent
Tan et al.

(10) Patent No.: US 12,249,778 B2
(45) Date of Patent: Mar. 11, 2025

(54) PSAS 5.0 FEMALE CONNECTOR

(71) Applicant: Amphenol East Asia Electronic Technology (Shenzhen) Co., Ltd., Shenzhen (CN)

(72) Inventors: Yan-Bin Tan, Shenzhen (CN); Xiang Wang, Shenzhen (CN); Lei Liao, Shenzhen (CN); Wei Luo, Shenzhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 3 days.

(21) Appl. No.: 18/084,454

(22) Filed: Dec. 19, 2022

(65) Prior Publication Data

US 2023/0124724 A1 Apr. 20, 2023

Related U.S. Application Data

(63) Continuation of application No. 17/307,276, filed on May 4, 2021, now abandoned.

(51) Int. Cl.

| | |
|---|---|
| ***H01R 12/70*** | (2011.01) |
| ***H01R 13/42*** | (2006.01) |
| ***H01R 13/502*** | (2006.01) |

(52) U.S. Cl.

CPC ............. *H01R 12/70* (2013.01); *H01R 13/42* (2013.01); *H01R 13/502* (2013.01)

(58) Field of Classification Search

CPC ....... H01R 12/70; H01R 13/42; H01R 13/502

See application file for complete search history.

(56) References Cited

U.S. PATENT DOCUMENTS 7,335,063 B2 2/2008 Cohen et al.
7,581,990 B2 9/2009 Kirk et al.
(Continued)

FOREIGN PATENT DOCUMENTS

CN 202585857 U 12/2012
CN 203205638 U 9/2013
(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.
(Continued)

*Primary Examiner* — Abdullah A Riyami
*Assistant Examiner* — Nader J Alhawamdeh
(74) *Attorney, Agent, or Firm* — Wolf, Greenfield & Sacks, P.C.

(57) ABSTRACT

PSAS 5.0 female connector includes a framework member having a main conductive plastic, a terminal member, and a cover member; the terminal member is inserted in the framework member and includes a SATA 7Pin terminal set having a SATA 7Pin terminal, a plastic frame member, and a SATA 7Pin conductive plastic; the SATA 7Pin terminal is inserted in the plastic frame member, and the SATA 7Pin conductive plastic is engaged on the plastic frame member for fastening the SATA 7Pin terminal in the plastic frame member; the cover member includes a SATA 7Pin outer cover plate stably attached to one side of the plastic frame member and a SATA 7Pin inner cover plate stably attached to another side of the SATA 7Pin conductive plastic. The present invention resolves the insufficiency of transmission rate fulfills multiple high frequency performance.

20 Claims, 2 Drawing Sheets

(56) References Cited

U.S. PATENT DOCUMENTS

| | | | | |
|---|---|---|---|---|
| 8,462,502 | B2 | 6/2013 | Hirano et al. | |
| 8,585,440 | B2 | 11/2013 | Jiang et al. | |
| 8,702,451 | B2 | 4/2014 | Luo et al. | |
| 8,740,631 | B2 | 6/2014 | Chen | |
| 9,225,090 | B2 | 12/2015 | Chen | |
| 9,407,022 | B1 | 8/2016 | Wang | |
| 9,564,714 | B1 * | 2/2017 | Wang | H01R 13/6461 |
| 9,941,641 | B1 | 4/2018 | Jiang et al. | |
| 9,985,391 | B1 * | 5/2018 | Wang | H01R 13/6597 |
| 10,283,910 | B1 * | 5/2019 | Chen | H01R 4/04 |
| 10,411,376 | B1 * | 9/2019 | Wang | H01R 13/502 |
| 10,651,589 | B1 | 5/2020 | Wang et al. | |
| 10,763,608 | B1 * | 9/2020 | Wang | H01R 27/00 |
| 11,251,554 | B1 | 2/2022 | Tan et al. | |
| 11,581,687 | B2 | 2/2023 | Wang et al. | |
| 2014/0211389 | A1 * | 7/2014 | Zhou | H01R 13/516 361/679.4 |
| 2018/0205181 | A1 * | 7/2018 | Chen | H01R 13/6592 |
| 2019/0214753 | A1 | 7/2019 | Jiang et al. | |
| 2020/0028289 | A1 * | 1/2020 | Dai | H01R 13/6595 |
| 2021/0399455 | A1 * | 12/2021 | Wang | H01R 13/11 |
| 2022/0077614 | A1 * | 3/2022 | Tan | H01R 13/6594 |
| 2022/0302655 | A1 | 9/2022 | Wang et al. | |
| 2022/0360000 | A1 | 11/2022 | Tan et al. | |
| 2023/0047671 | A1 | 2/2023 | Wang et al. | |
| 2023/0050934 | A1 | 2/2023 | Yin et al. | |

FOREIGN PATENT DOCUMENTS

| | | | |
|---|---|---|---|
| CN | 203850501 | U | 9/2014 |
| CN | 104283080 | A | 1/2015 |
| CN | 204376132 | U | 6/2015 |
| CN | 205016785 | U | 2/2016 |
| CN | 103887641 | B | 6/2016 |
| CN | 205944534 | U | 2/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 212380677 | U | 1/2021 |
| CN | 215816686 | U | 2/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Wang et al., PCIE/SAS Female Connector, U.S. Appl. No. 18/076,066, filed Dec. 6, 2022.

Yin et all., High Speed Plug Connector, U.S. Appl. No. 17/848,851, filed Jun. 24, 2022.

* cited by examiner

PSAS 5.0 FEMALE CONNECTOR

CROSS-REFERENCE TO RELATED APPLICATIONS

This application is a continuation of U.S. application Ser. No. 17/307,276, filed May 4, 2021, entitled "PSAS 5.0 FEMALE CONNECTOR", which is hereby incorporated herein by reference in its entirety.

TECHNICAL FIELD

The present invention relates to connectors, and more particularly, to a PSAS 5.0 female connector.

BACKGROUND

Current PSAS 5.0 female connector achieves a 32 Gbps transmission rate and is mainly applied for enterprise level servers and related high speed transmission systems. As the information storage amount continuously grows, the demand for connector transmission rate and the requirement of simultaneously fulfilling multiple high frequency performance accordingly increase.

BRIEF SUMMARY

To improve the issues above, the present invention discloses a PSAS 5.0 female connector. With optimized structure, the present invention resolves the insufficiency of transmission rate and the disadvantage of incapability of fulfilling multiple high frequency performance suffered by conventional connectors.

For achieving the aforementioned objectives, a PSAS 5.0 female connector is provided, comprising a framework member, a terminal member, and a cover member; the framework member comprises a main conductive plastic; the main conductive plastic is disposed in the framework member; the terminal member is inserted in the framework member, and the terminal member comprises a SATA 7Pin terminal set; the SATA 7Pin terminal set comprises a SATA 7Pin terminal, a plastic frame member, and a SATA 7Pin conductive plastic; the SATA 7Pin terminal is inserted in the plastic frame member, and the SATA 7Pin conductive plastic is engaged on the plastic frame member, so as to fasten the SATA 7Pin terminal in the plastic frame member; the cover member comprises a SATA 7Pin outer cover plate and a SATA 7Pin inner cover plate; when the SATA 7Pin terminal set is inserted in the framework member, the SATA 7Pin outer cover plate is stably attached to one side of the plastic frame member inside the framework member; the SATA 7Pin inner cover plate is stably attached to another side of the SATA 7Pin conductive plastic on an outer side of the framework member; the SATA 7Pin inner cover plate is conducted with a far engagement end of the SATA 7Pin terminal; when the female connector is engaged with a male to female connector, the SATA 7Pin outer cover plate is conducted with a close engagement end of the SATA 7Pin terminal.

Preferably, the terminal member involved in the PSAS 5.0 female connector comprises a SAS 40Pin terminal set; when the SAS 40Pin terminal set is inserted in the framework member, a SAS 40Pin cover plate is attached to one side of the SAS 40Pin terminal set on the outer side of the framework member.

Preferably, the PSAS 5.0 female connector comprises a rear cap; when a combination of the terminal member and the cover member is inserted in the framework member, the rear cap is engaged to the outer side of the framework member, so as to enclose the combination of the terminal member and the cover member in the framework member.

Preferably, the PSAS 5.0 female connector comprises a fix plate; the fix plate is inserted on two ends of the framework member, with a head portion of the fix plate passing through the framework member to be fixed on a PCB.

With such configuration, the present invention achieves following advantages.

The present invention provides a PSAS 5.0 female connector. Through optimized structure, the present invention resolves the insufficiency of transmission rate and the disadvantage of incapability of fulfilling multiple high frequency performance suffered by conventional connectors. The SATA 7Pin terminal comprises a cover plate on two sides thereof, wherein the SATA 7Pin inner cover plate is conducted to the SATA 7Pin conductive plastic and the far engagement end of the SATA 7Pin terminal at the same time. After the male head and female head engagement, the SATA 7Pin outer cover plate contacts the main conductive plastic and a close engagement of a SATA 7Pin grounding terminal. Therefore, the SATA 7Pin terminal is conducted with the outer and inner cover plates simultaneously, thereby fulfilling a high frequency performance requirement.

DETAILED DESCRIPTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, the present invention is described in detail with a specific embodiment. However, such embodiment does not limit the present invention.

Embodiment 1

Figure 1:
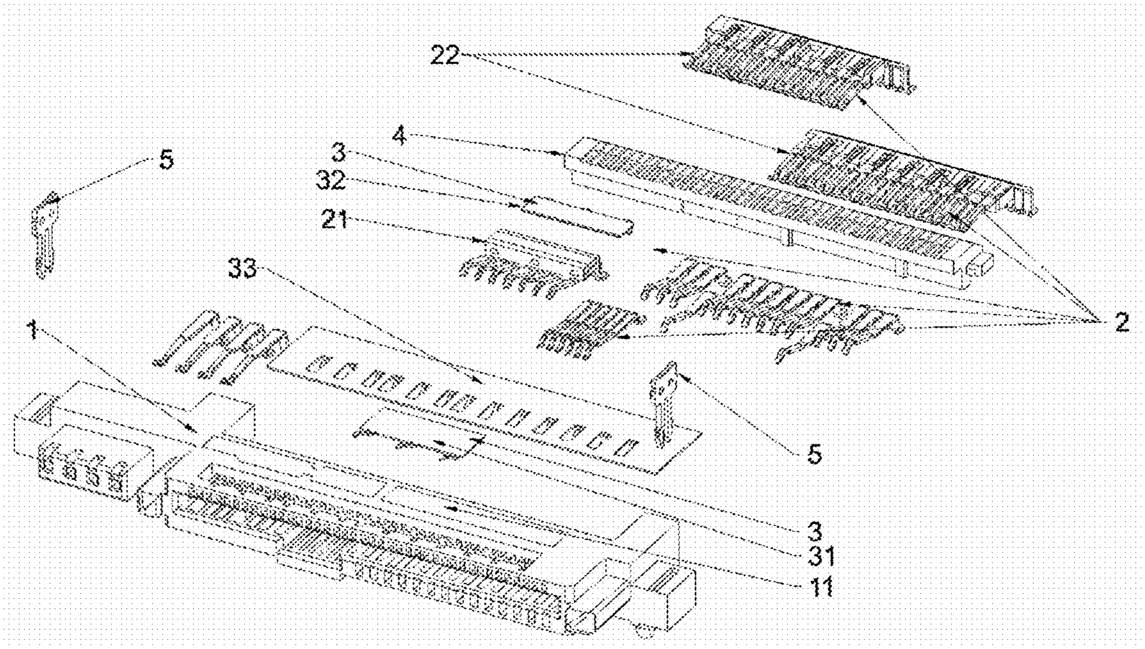
FIG. 1 is an exploded view of the PSAS 5.0 female connector in accordance with an embodiment of the present invention.
Figure 2:
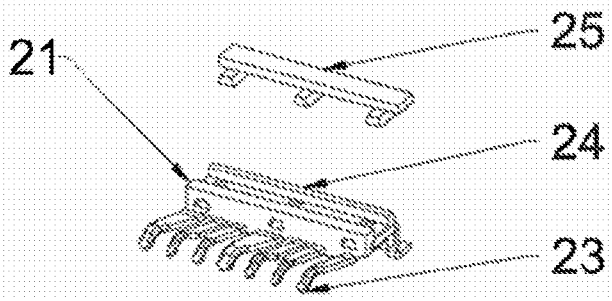
FIG. 2 is an exploded view of the SATA 7Pin terminal set in accordance with an embodiment of the present invention.

Referring to FIG. 1 to FIG. 2, a PSAS 5.0 female connector comprises a framework member 1, a terminal member 2, and a cover member 3;

the framework member 1 comprises a main conductive plastic 11;

the main conductive plastic 11 is disposed in the framework member 1;

the terminal member 2 is inserted in the framework member 1, and the terminal member 2 comprises a SATA 7Pin terminal set 21;

the SATA 7Pin terminal set 21 comprises a SATA 7Pin terminal 23, a plastic frame member 24, and a SATA 7Pin conductive plastic 25; the SATA 7Pin terminal 23 is inserted in the plastic frame member 24, and the SATA 7Pin conductive plastic 25 is engaged on the plastic frame member 24, so as to fasten the SATA 7Pin terminal 23 in the plastic frame member 24.

Figure 3:
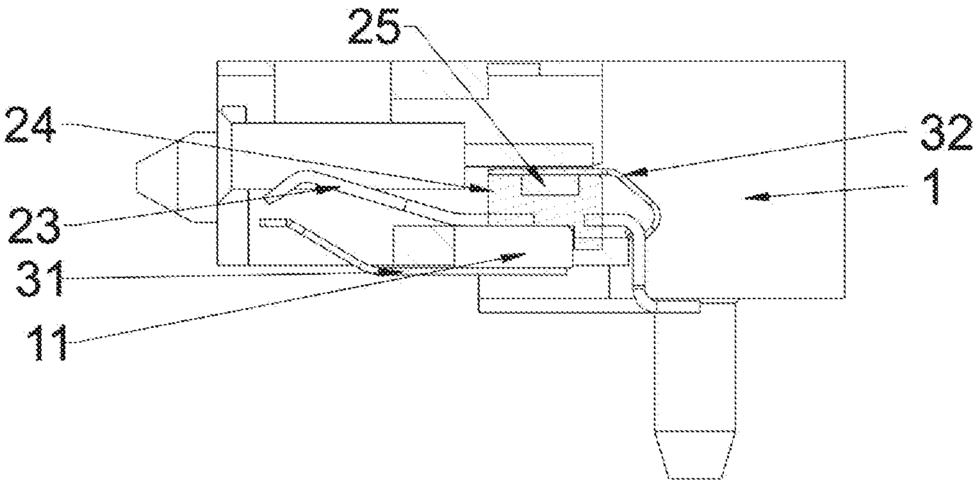
FIG. 3 is a sectional side view of the PSAS 5.0 female connector (not engaged).
Figure 4:
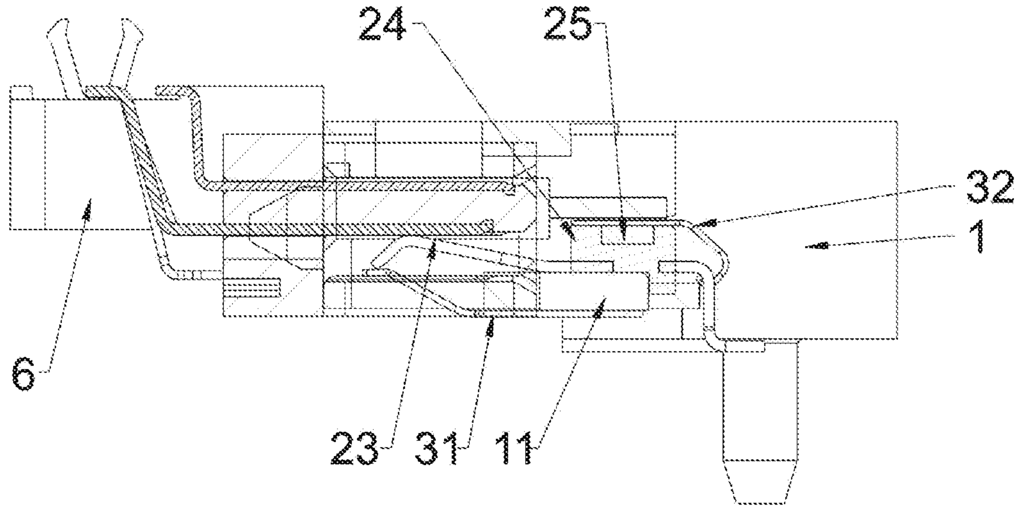
FIG. 4 is a sectional side view of the PSAS 5.0 female connector (engaged).

Referring to FIG. 3 and FIG. 4, the cover member 3 comprises a SATA 7Pin outer cover plate 31 and a SATA 7Pin inner cover plate 32;

when the SATA 7Pin terminal set 21 is inserted in the framework member 1, the SATA 7Pin outer cover plate 31 is stably attached to one side of the plastic frame member 24 and inside the framework member 1; the SATA 7Pin inner cover plate 32 is stably attached to another side of the SATA 7Pin conductive plastic 25 on an outer side of the framework member 1;

the SATA 7Pin inner cover plate 32 is conducted with a far engagement end of the SATA 7Pin terminal 23;

when the female connector of the present invention is engaged with a male to female connector 6, the SATA 7Pin outer cover plate 31 is conducted with a close engagement end of the SATA 7Pin terminal 23.

Embodiment 2

Referring to FIG. 2 to FIG. 4, on the basis of the embodiment 1, when the SAS 40Pin terminal set 22 related to the PSAS 5.0 female connector is inserted in the framework member 1, a SAS 40Pin cover plate 33 is attached to one side of the SAS 40Pin terminal set 22 on the outer side of the framework member 1.

The PSAS 5.0 female connector comprises a rear cap 4; when a combination of the terminal member 2 and the cover member 3 is inserted in the framework member 1, the rear cap 4 is engaged to the outer side of the framework member 1, so as to enclose the combination of the terminal member 2 and the cover member 3 in the framework member 1.

The PSAS 5.0 female connector comprises a fix plate 5; the fix plate 5 is inserted on two ends of the framework member 1, with a head portion of the fix plate 5 passing through the framework member 1 to be fixed on a PCB.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electrical connector, comprising:
a framework;
a terminal set inserted in the framework, the terminal set comprising a plurality of terminals, a plastic frame, and conductive plastic, wherein the plurality of terminals are inserted in the plastic frame, and the conductive plastic engages the plastic frame so as to fasten the plurality of terminals in the plastic frame; and
an outer cover and an inner cover, wherein:
the outer cover is attached to one side of the plastic frame;
the inner cover is attached to another side of the plastic frame and engages the conductive plastic; and
the inner cover electrically couples to far engagement ends of selected ones of the plurality of terminals.

2. The electrical connector of claim 1, wherein:
the electrical connector is configured according to one or more PSAS standards;
the terminal set is a first terminal set;
the outer cover is a first outer cover;
the electrical connector comprises a second terminal set inserted in the framework and a second outer cover; and
the second outer cover is attached to one side of the second terminal set.

3. The electrical connector of claim 1, further comprising a rear cap, wherein:
the rear cap engages an outer side of the framework, so as to enclose the terminal set, the inner cover, and the outer cover in the framework.

4. The electrical connector of claim 1, further comprising a pair of fix plates inserted on two ends of the framework, respectively, each of the pair of fix plates comprising a head portion passing through the framework and configured to be fixed on a PCB.

5. The electrical connector of claim 1, wherein:
when the electrical connector is mated with a mating connector, the outer cover couples to close engagement ends of the selected ones of the plurality of terminals.

6. An electrical connector, comprising:
a framework;
a terminal set disposed in the framework, the terminal set comprising a plurality of terminals, and a frame holding the plurality of terminals, each of the plurality of terminals comprising a tail end extending out of a rear end of the framework; and
a shield comprising a first portion disposed on the frame of the terminal set, and a second portion extending out of the rear end of the framework and engaging the tail ends of selected ones of the plurality of terminals.

7. The electrical connector of claim 6, wherein:
the first portion of the shield is disposed in the framework such that the second portion of the shield stably engages the tail ends of selected ones of the plurality of terminals.

8. The electrical connector of claim 6, wherein:
the terminal set is a first terminal set;
the electrical connector comprises a second terminal set disposed in the framework; and
the first portion of the shield is disposed between the first terminal set and the second terminal set.

9. The electrical connector of claim 6, wherein:
the shield is a first conductive member;
the electrical connector comprises a second conductive member; and
the second conductive member is disposed in the framework and separated from the first conductive member by the terminal set such that the second conductive member is stably disposed in the framework.

10. The electrical connector of claim 9, wherein:
each of the plurality of terminals comprises a mating end opposite the tail end; and
the second conductive member comprises a plurality of contact members configured to engage the mating ends of the selected ones of the plurality of terminals when the plurality of terminals are mated with complementary components.

11. The electrical connector of claim 10, wherein:
the terminal set is a first terminal set;
the plurality of terminals are a first plurality of terminals; and
the electrical connector comprises a second terminal set disposed in the framework and a third conductive member disposed in the framework and separated from the first conductive member by the second terminal set such that the third conductive member is stably disposed in the framework.

12. The electrical connector of claim 11, wherein:
the second terminal set comprises a second plurality of terminals; and the third conductive member comprises a plurality of contact members configured to engage selected ones of the second plurality of terminals when the second plurality of terminals are mated with complementary components.

13. The electrical connector of claim 12, wherein:

the framework comprises conductive plastic coupled to the third conductive member.

14. The electrical connector of claim 11, further comprising:

a rear member disposed at the rear end of the framework so as to enclose the first terminal set, the second terminal set, the first conductive member, the second conductive member, and the third conductive member in the framework.

15. An electrical assembly, comprising:

a frame comprising a recess;

conductive plastic disposed in the recess of the frame;

a plurality of terminals inserted in the plastic frame, each of the plurality of terminals comprising a mating end extending out of a front end of the frame and a tail end extending out of a rear end of the frame; and a shield configured to couple the conductive plastic to the tail ends of selected ones of the plurality of terminals.

16. The electrical assembly of claim 15, wherein:

the shield comprises one or more contact portions curving towards the plurality of terminals so as to engage the tail ends of the selected ones of the plurality of terminals.

17. The electrical assembly of claim 16, wherein:

the shield comprises a plate disposed on the conductive plastic so as to engage the conductive plastic.

18. The electrical assembly of claim 16, wherein:

the shield is a first conductive member disposed on a first side of the frame; and the electrical assembly comprises a second conductive member disposed on a second side of the frame that is opposite the first side.

19. The electrical assembly of claim 18, wherein:

the second conductive member comprises a plurality of contact members configured to engage the mating ends of the selected ones of the plurality of terminals when the plurality of terminals are mated with complementary components.

20. The electrical assembly of claim 16, wherein:

the tail end of each of the selected ones of the plurality of terminals comprises a first portion, a second portion, a third portion, a first bend joining the first portion and the second portion, and a second bend joining the second portion and the third portion; and the one or more contact portions of the shield engage the selected ones of the plurality of terminals at respective first bends and/or second portions.

* * * * *